United States Patent
Kobziar et al.

(10) Patent No.: US 11,448,352 B1
(45) Date of Patent: Sep. 20, 2022

(54) PLUG ASSEMBLY

(71) Applicant: EST Group, Inc., Hatfield, PA (US)

(72) Inventors: Danko Kobziar, Lansdale, PA (US); Ka'ren Sarkissian, Langhorne, PA (US); Andrew Hall, Ottsville, PA (US); Alex Kotlyar, Jamison, PA (US)

(73) Assignee: EST GROUP, INC., Hatfield, PA (US)

( * ) Notice: Subject to any disclaimer, the term of this patent is extended or adjusted under 35 U.S.C. 154(b) by 0 days.

(21) Appl. No.: 17/192,238

(22) Filed: Mar. 4, 2021

(51) Int. Cl.
*F16L 55/11* (2006.01)
*F16L 55/13* (2006.01)

(52) U.S. Cl.
CPC ........... *F16L 55/1141* (2013.01); *F16L 55/13* (2013.01)

(58) Field of Classification Search
CPC ..... F16L 55/1141; F16L 55/128; F16L 55/13; F16L 55/132; F16L 55/136; F28F 11/02
USPC .......................................................... 411/43
See application file for complete search history.

(56) References Cited

U.S. PATENT DOCUMENTS

| | | | |
|---|---|---|---|
| 2,856,963 A | 10/1958 | Hoerter | |
| 3,285,121 A * | 11/1966 | Siebol | F16B 19/1054 411/43 |
| 3,292,482 A * | 12/1966 | Fry | F16B 19/1054 29/512 |
| 3,967,234 A | 6/1976 | Jones | |
| 4,390,042 A | 6/1983 | Kucherer et al. | |
| 4,407,619 A * | 10/1983 | Siebol | F16B 19/1054 411/69 |
| 4,425,943 A | 1/1984 | Martin | |
| 4,436,117 A | 3/1984 | Martin | |
| 4,702,655 A * | 10/1987 | Kendall | F16B 19/1054 29/523 |
| 4,751,944 A | 6/1988 | Sinha et al. | |
| 5,078,294 A * | 1/1992 | Staubli | F16L 55/13 220/233 |
| 5,437,310 A | 8/1995 | Cunningham | |
| 5,437,340 A | 8/1995 | Lee et al. | |
| 5,456,290 A | 10/1995 | Haberman et al. | |
| 7,314,065 B1 | 1/2008 | Adelman | |
| 9,452,491 B1 * | 9/2016 | Littell | B23K 20/1295 |
| 9,541,337 B2 | 1/2017 | Al-Otaibi | |
| 10,724,808 B2 | 7/2020 | Alhassan et al. | |
| 2015/0202754 A1 * | 7/2015 | Kirilichin | F16L 55/13 29/523 |
| 2016/0069370 A1 * | 3/2016 | Jiang | F16B 19/1054 411/510 |
| 2018/0112811 A1 * | 4/2018 | Cis | B65D 39/12 |
| 2018/0238482 A1 * | 8/2018 | Cis | F16L 55/132 |
| 2019/0128465 A1 * | 5/2019 | Cis | F16L 55/13 |

* cited by examiner

*Primary Examiner* — Robert K Arundale
*Assistant Examiner* — Richard K. Durden
(74) *Attorney, Agent, or Firm* — Howson & Howson LLP

(57) ABSTRACT

A pin and ring-type plug assembly for plugging a heat exchanger tube to provide a leak resistant seal is provided. The plug assembly is designed such that it can be used to form a high-pressure seal relative to a wide of range of tube inner diameters. The angle of taper of the pin varies along a length of the pin such that the angle of taper is steepest at or adjacent a nose section of the pin and is shallowest at or adjacent an end section of the pin.

8 Claims, 3 Drawing Sheets

PLUG ASSEMBLY

BACKGROUND

The present invention relates to expandable plugging devices, and more particularly, the present invention relates to an expandable plug assembly which is particularly suited for use in plugging tubes such as may be found in heat exchangers.

Shell and tube-type heat exchangers customarily comprise a bundle of tubes mounted in spaced parallel relation at opposite ends in tube sheets. The tube bundle is surrounded by a shell through which a medium is flowed between an inlet and an outlet of the shell. Heads are provided on opposite ends of the shell to afford the flow of another medium through the interior of the tube bundles. In multiple pass heat exchangers, one head end of the heat exchanger may be provided with flow reversing means to cause the fluid to flow within selected tubes and make several passes before exiting the heat exchanger.

Heat exchangers of the above type have been known to fail in use and to require repair. Generally, this is accomplished by removing the head at opposite ends of the tube, and either removing, or replacing, the defective tube, or plugging the defective tube. Since such heat exchangers are often integral components of continuous plant processes, it is important that they be repaired quickly within a minimum of downtime.

Various types of plugs are known for sealing off defective tubes. A typical plug assembly comprises a radially deformable ring adapted to be placed in a tube of a heat exchanger in alignment with its tube sheet and an elongated pin having a conical shape with a constant taper along its length which is slidably received within the ring for expanding the ring outwardly when the pin is pulled axially relative to the ring. U.S. Pat. No. 5,437,310 issued to Cunningham and U.S. Pat. No. 4,425,943 issued to Martin provide examples.

As the pin is advanced through the ring, the ring expands and compresses against an inner diameter wall of a tube thereby forming a metal-to-metal seal. A breakaway member is mounted at the narrow end of the pin and is connected to a pull rod which cooperates with a compression tube engaging the sleeve to pull the pin into the ring and expand the ring outwardly to provide a fluid type of joint. After a predetermined amount of outward pressure has been applied, the breakaway ruptures to permit removal of the pull rod and compression tube from within the plugged tube.

Tube plugs have conventionally been divided into two categories; namely, ones that are able to accommodate and provide a seal with respect to tube inner diameters within a relatively wide range (i.e., one size of plug that can be used on tubes of different diameters) and ones able to produce a seal that is able to withstand relatively high-pressures. As discussed above, the plug functions by pulling the conical tapered pin through the ring thereby expanding and compressing the ring against the tube inside diameter forming a metal-to-metal seal.

There are functional and design considerations with regards to the above referenced two types of plugs. Pins are necessarily limited in length, and when the ring is set within a tube sheet, the pin should not protrude out of the tube. In addition, the pins and rings are limited relative to available installation force, based on strength of materials and tubes.

Plugs which provide a larger range of sealing diameters have an advantage of being able to seal multiple tube sizes; however, they are significantly limited in their pressure holding capabilities. These plugs have a consistent relatively-steep conical pin angle that allows the ring to stretch to accommodate a large range; however, because of the high angle of taper, there is less radial force compressing the ring into the tube inner diameter. Thus, there is less force holding the plug in place (the radial force used to expand and compress the ring is proportional to the inverse of the tangent of the pin angle).

Plugs able to accommodate relatively higher-pressure have a consistent relatively-shallow conical pin angle so that more of the installation force is transmitted radially to the ring during the installation and thereby allowing the plug to hold a high pressure. However, the drawback of the low pin angle is that expansion of the ring, to seal the tube, is limited relative to range of tube inner diameter due to the limitations of the pin length and low taper angle.

Accordingly, while the aforementioned plug assemblies and associated placement apparatus function entirely satisfactory for their intended purposes, it has been found that the creation of an effective seal within a wide range of tube inner diameter of relatively high holding capabilities is difficult to accomplish. Hence, a plug assembly which can successfully apply an effective seal on a wide range of tube inner diameter and of high pressure holding capability is particularly desirable.

SUMMARY

A plug assembly for use in plugging a tube is provided and comprises a sealing ring having an inner surface and an outer surface. The outer surface of the ring is adapted to be expanded and compressed against a tube inner diameter for forming a seal therewith. The plug assembly also includes a pin receivable within the ring for radially outwardly expanding and compressing the sealing ring when the pin is caused to be displaced axially through the ring. The pin extends longitudinally from a front end to a rear end and has an outer surface extending from the front end to the rear end. The front end has an outer diameter that is less than an outer diameter of the rear end such that the outer surface of the pin is tapered along the length of the pin. The inner surface of the ring and the outer surface of the pin are disposed in confronting relation and are slidable relative to one another from the front end to the rear end of the pin. The pin has a nose section which includes the front end, a rear section which includes the rear end, and an intermediate section that extends from the nose section to the rear section. An outer diameter of the intermediate section increases along a length thereof from the nose section to the rear section such that an angle of taper of the intermediate section adjacent the nose section is greater than an angle of taper of the intermediate section adjacent the rear section.

BRIEF DESCRIPTION OF THE DRAWINGS

The features and advantages of the present invention should become apparent from the following description when taken in conjunction with the accompanying drawings, in which.

DETAILED DESCRIPTION

Figure 1:
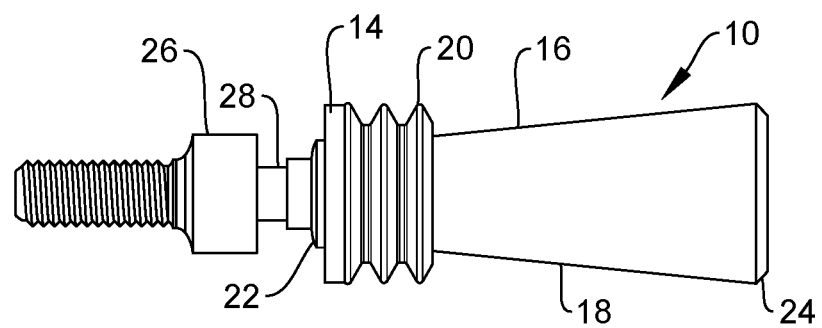
FIG. 1 is a side elevational view of a prior art plug assembly.

FIG. 1 illustrates a prior art plug assembly 10 for use in plugging a tube such as a heat exchanger tube. The plug assembly 10 has a compression ring 14 and a pin 16 received within the compression ring 14. The pin 16 has a conical shape with an outer surface 18 that tapers at a constant angle between oppose end walls of the pin 16. The ring 14 is shaped to fit within a cylindrical tube to be sealed.

The ring 14 has an outer surface 20 for being expanded into, contacting, and being compressed against an inner surface of the tube and has an inner surface for contacting, sliding along, and being expanded by the tapered outer surface 18 of the pin 16 as the pin is pulled through the ring 14 and as the ring 14 is maintained at a stationary position within the tube.

The conventional compression pin 16 has a frustoconical shape with a narrow end 22 (i.e., pin nose) and an enlarged end 24 (i.e., pin end). There is a constant taper at a constant angle of taper between the narrow end 22 and enlarged end 24. See FIG. 1 as an example.

The plug assembly can be used with a breakaway 26 that is connected to the pin nose 22. The opposite end of the breakaway 26 is connected to a pulling mechanism (not shown) of the type, for instance, as described in U.S. Pat. Nos. 4,425,943 and 5,437,310, the disclosures of which are hereby incorporated by reference herein. The pulling mechanism is supported against one end of the ring 14 and acts hydraulically, or mechanically, to pull the pin 16 through the ring 14 thereby expanding the ring radially outward until it contacts the inner diameter wall of the tube and is compressed thereagainst to form a metal-to-metal seal against the inner diameter surface of the tube. The breakaway 26 is designed to function in a manner which provides an automatic release after a predetermined sealing force has been applied by the pin 16 to the ring 14. The breakaway 26 accomplishes this release at the point where the force pulling the pin 16 through the ring 14 increases the tensile stress in a relieved portion 28 of the breakaway 26 to cause its fracture. As alternatives to a breakaway type of connector described above, a pulling stud connector may be used which may not rely on a breakaway feature or a connector integrated with a pulling mechanism may be used.

Embodiments of a plug assembly disclosed herein are able to provide higher pressure rated tube plugs (i.e., as compared with conventional plugs having pins with a constant shallow taper) while also providing such seals against tube walls within a greater range of inner diameters (i.e., as with conventional plugs having pins with a constant steep taper).

Figure 2:
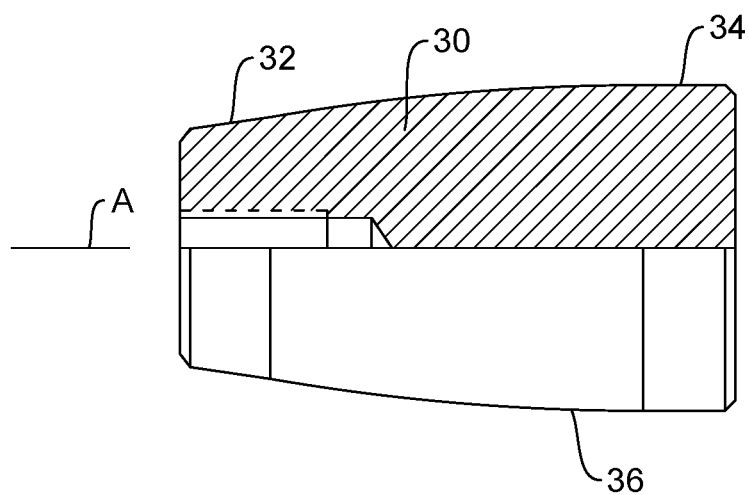
FIG. 2 is a partially cut-away side elevational view of a pin according to an embodiment.

According to embodiments disclosed herein, a novel pin geometry, for instance, as shown in FIG. 2, is utilized.

For any given range of tube diameter, pressure holding capability of a plug having a constant taper is greater at a lower end of the range verses at the upper end of the range. For the upper end of the range, more of the installation force is used to expand the ring to meet the tube inner diameter versus being used to compress the ring; thus, pressure holding capabilities are reduced. Plugs are rated to a minimum guaranteed holding pressure across the range of the plugs. Thus, such limitation comes from the pressure holding performance at the large end of the operational range. Embodiments disclosed herein increase the holding capability at the upper end of a plug's range, thereby increasing the pressure rating of the plug.

According to embodiments, the angle or taper of the pin along its length is not consistent; rather, it is varied. For purposes of increasing installation force at the larger end of the pin, the pin taper angle is decreased at the larger end. Accordingly, a radial force on the ring can remain the same since pin taper angle changes along the length of the pin to overcome the forces required to expand and cold work the ring. The performance of the plug at the large range is able to provide an increase in the pressure rating of the plug.

Thus, given a set pin length and installation force, by providing a pin such that the taper angle at the nose of the pin is steeper than the taper angle at the end of the pin, a tube plug can be provided that can be used within a large range of tube diameters while also providing high pressure holding performance throughout the full range without requiring an increase in installation force or plug length.

FIG. 2 provides an embodiment of a variable angle pin 30. Unlike conventional pins, the pin 30 does not have a uniform constant end-to-end taper. Rather, the pin 30 has different sections having different taper angles. For example, the pin 30 has a nose section 32, an end section 34 opposite the nose section 32, and an intermediate section 36 that extends from the nose section 32 to the end section 34.

The angle of taper (i.e., the angle of the outer surface of the pin 30 along a length of the pin 30 relative to the longitudinally axis "A" of the pin 30) may be constant in both the nose section 32 and end section 34; however, the angle of taper of the nose section is greater (i.e., provides a steeper taper) than that of the end section 34 (i.e., provides a shallower taper). The outer surface of the intermediate section 36 smoothly transitions from the steeper taper angle of the nose section 32 to the shallower taper of the end section 34 as it extends from the nose section 32 to the end section 34. Thus, the taper angle of the outer surface of the intermediate section 36 varies along its length and gradually transitions from the steep angle of the nose section 32 to the shallow angle of the end section 34. See FIG. 2.

Accordingly, an outer diameter of the intermediate section 36 may increase along a length thereof from the nose section to the rear section such that an angle of taper of the intermediate section adjacent the nose section is greater than an angle of taper of the intermediate section adjacent the rear section. The angle of taper of the intermediate section 36 gradually decreases as the intermediate section extends from the nose section to the rear section.

As alternatives to the configurations described above, the nose section or the end section, or both, may be provided with a variable angle of taper along their lengths. In addition, the intermediate section may not smoothly transition where it transitions from the nose section or the rear section. For instance, a step-like or other abrupt, non-smooth transition may exist. In addition, the single intermediate section described above may include several distinct intermediate sections positioned end-to-end between the nose section and the rear section with each distinct intermediate section having a distinct taper pattern or a repeating taper pattern with each adjacent intermediate section being generally of greater outer diameter then the preceding one as arranged from the nose section to the rear section.

Figure 3:
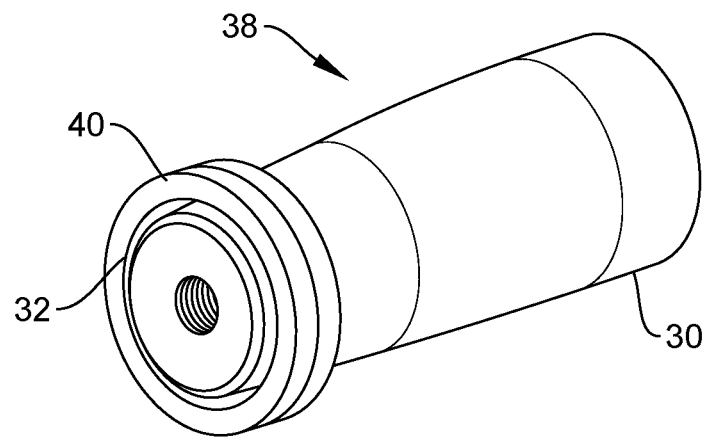
FIG. 3 is a perspective view of a plug assembly having the pin of FIG. 2 according to an embodiment.

As shown in FIG. 3, a plug assembly 38 may include a pin 30 and compression or sealing ring 40 such that the ring 40 is engaged and in contact with the outer surface of the nose section 32 of the pin 30. In use, the pin 30 is forced through the ring 40 as the ring 40 maintains a fixed position within a tube, and the ring 40 is thereby expanded outwardly along the relatively steep angle of the nose section 32. If the pin 30 is pulled further through the ring 40, the ring 40 becomes engaged with the intermediate section 36 of the pin 30. The intermediate section 36 adjacent the nose section 32 provides a relatively steep taper angle; however, as the ring 40 is advanced further along the intermediate section 36, the angle of taper becomes shallower. Ultimately, the ring 40 may be advanced onto the end section 34 of the pin which is of the shallowest taper. Thus, a high pressure rated seal can be provided at an upper end range of inner diameter. Accordingly, the plug assembly 38 is able to be used to apply a high pressure rated seal to a relatively wide range of tube inner diameters thereby ensuring a high pressure rated seal even at larger inner diameters within the range.

Figure 4:
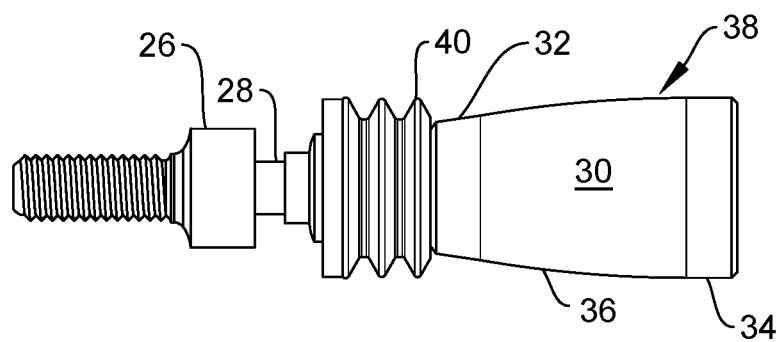
FIG. 4 is a side elevational view of a plug assembly having the pin of FIG. 2.

As shown in FIG. 4, the plug assembly 38 may include the pin 30, the compression or sealing ring 40, and a breakaway connector 26 including a relieved portion 28.

Testing has shown a pressure holding enhancement from 50% to 75% over conventional wide range tube plugs while maintaining the full range of the plug. The performance of the plug assembly 38 is in line with high pressure capabilities of conventional high pressure plugs.

Figure 5:
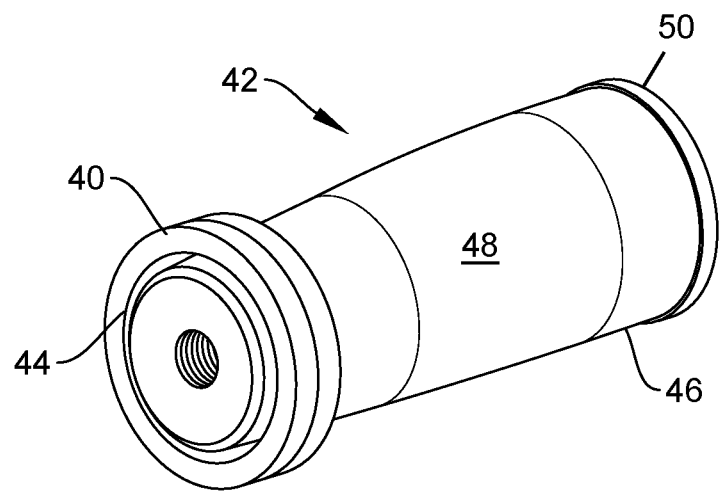
FIG. 5 is a perspective view of a pin according to an alternate embodiment.

An alternate embodiment of a variable angle pin 42 is shown in FIG. 5. Similar to pin 30, the pin 42 does not have a uniform constant end-to-end taper. Rather, the pin 42 has different sections having different taper angles. For example, the pin 42 has a nose section 44, an end section 46 opposite the nose section 44, and an intermediate section 48 that extends from the nose section 44 to the end section 46. In this embodiment, the end section 46 includes a raised or stepped rear edge 50. The raised edge 50 prevents the pin 42 from extruding entirely through a sealing ring.

By way of example, and not by way of limitation, the ring 40 and pins 30 and 42 may be fabricated of brass, stainless steel, carbon steel, copper-nickel alloy, titanium, nickel-molybdenum alloy, or zirconium, or any other metal or alloy depending upon the operating environment in which the plug assembly is to be installed, such as pressure, temperature, service life, and the like.

In view of the foregoing, it should be apparent that embodiments disclosed herein provide improved plug assemblies which can be used to provide effective high pressure rated seals within in a wide range of inner diameters of tubes, such as heat exchanger tubes.

While a preferred embodiment of the present invention has been described in detail, various modifications, alterations, and changes may be made without departing from the spirit and scope of the present invention as defined in the appended claims.

We claim:

1. A plug assembly for use in plugging a tube, comprising:
a compression ring having an inner surface and an outer surface, said outer surface of said ring for contacting a tube inner diameter for forming a seal therewith; and
a pin receivable within said ring for radially outwardly expanding and compressing said ring against the tube inner diameter when said pin is displaced axially through said ring;
said pin extending longitudinally from a front end to a rear end and having an outer surface extending from said front end to said rear end, said front end having an outer diameter that is less than an outer diameter of said rear end such that said outer surface of said pin is tapered, said inner surface of said ring and said outer surface of said pin being disposed in confronting relation and being slidable relative to one another between said front end and said rear end of said pin;
said pin having a nose section which includes said front end, a rear section which includes said rear end, and an intermediate section that extends from said nose section to said rear section;
an outer diameter of said intermediate section increases along a length thereof from said nose section to said rear section such that an angle of taper of said intermediate section adjacent said nose section is greater than an angle of taper of said intermediate section adjacent said rear section; and
a portion of said outer surface of said pin along said nose section tapers at a constant angle relative to a longitudinal axis of said pin.

2. The plug assembly according to claim 1, wherein said angle of taper of said intermediate section gradually decreases as said intermediate section extends from said nose section to said rear section.

3. The plug assembly according to claim 1, wherein a portion of said outer surface of said pin along said rear section tapers at a constant angle relative to the longitudinal axis of said pin.

4. The plug assembly according to claim 3, wherein said constant angle of taper of said nose section is greater than said constant angle of taper of said rear section.

5. The plug assembly according to claim 1, wherein said compression ring and pin are each made of metal.

6. The plug assembly according to claim 5, wherein said compression ring and pin are made of brass, stainless steel, carbon steel, copper-nickel alloy, titanium, nickel-molybdenum alloy, or zirconium.

7. The plug assembly according to claim 1, further comprising a connector extending from said front end of said pin, wherein said connector is adapted to transmit a pulling force to said pin.

8. The plug assembly according to claim 1, wherein said rear section includes a stepped or raised edge.

* * * * *